United States Patent Office.

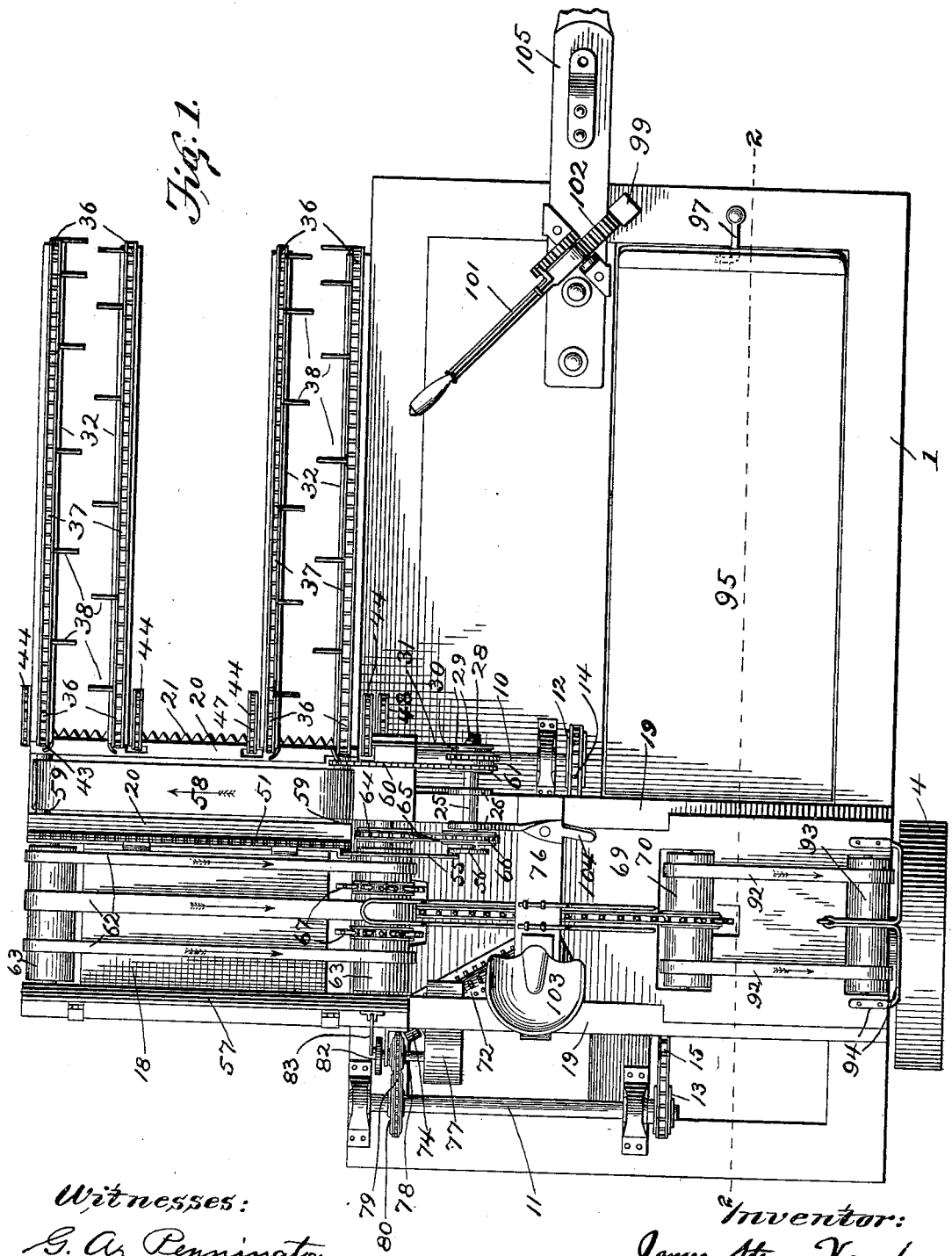

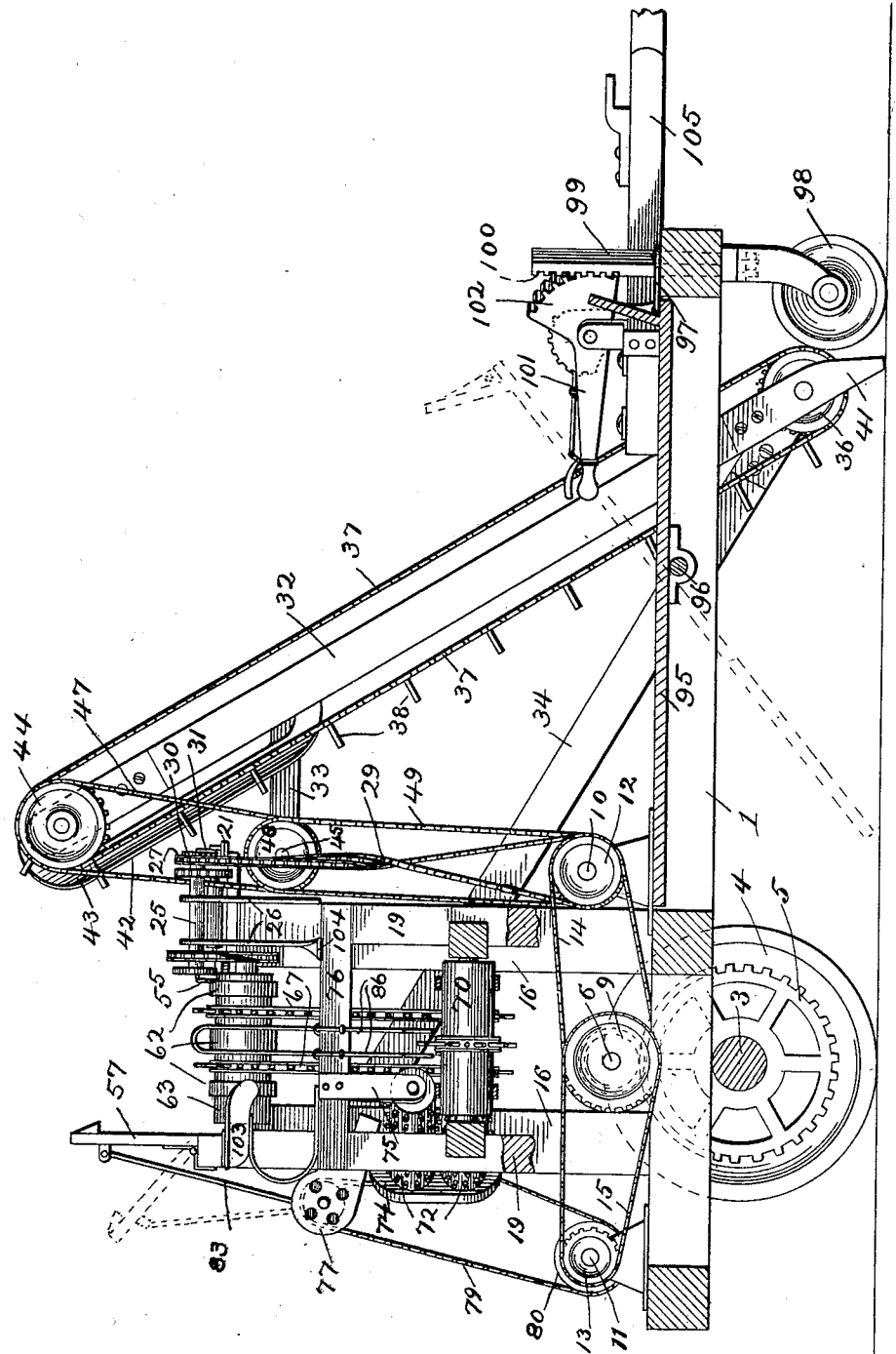

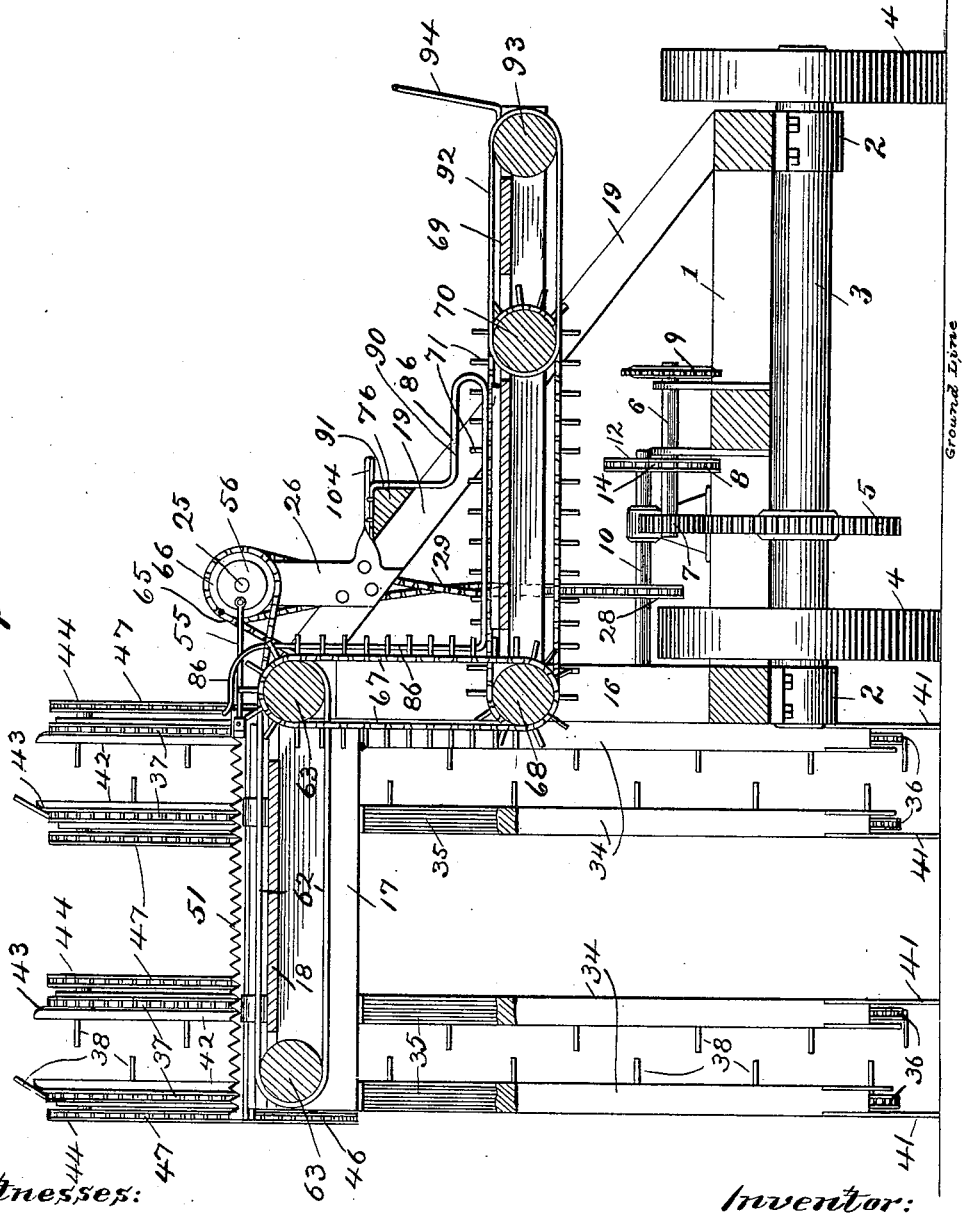

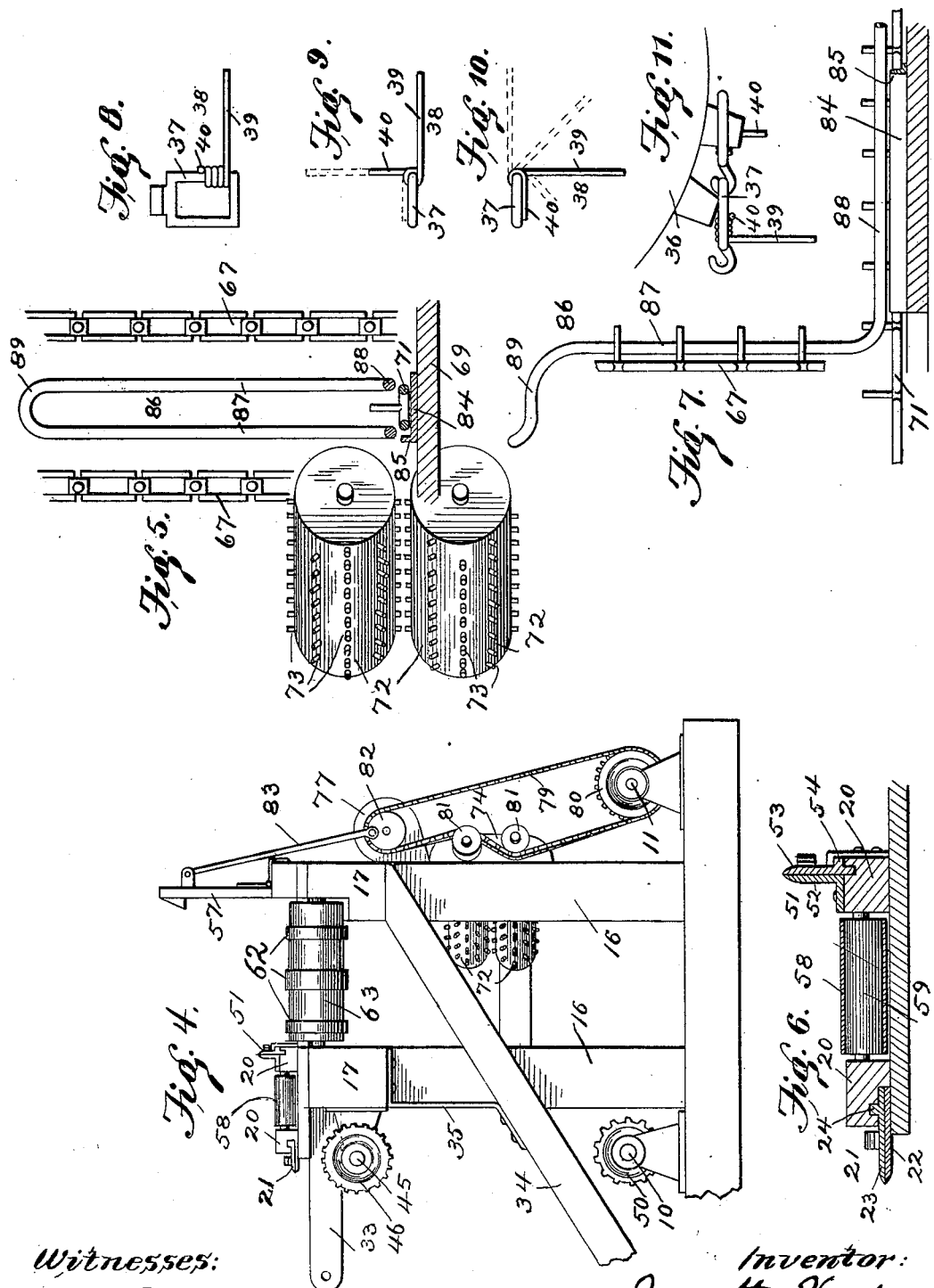

JAMES STEVEN VAUGHN, OF ALLENVILLE, ILLINOIS, ASSIGNOR OF TWO-THIRDS TO ALBERT R. COX AND JOHN A. RIDGWAY, OF SAME PLACE.

BROOM-CORN HARVESTER.

SPECIFICATION forming part of Letters Patent No. 646,612, dated April 3, 1900.

Application filed March 22, 1899. Serial No. 710,073. (No model.)

*To all whom it may concern:*

Be it known that I, JAMES STEVEN VAUGHN, a citizen of the United States, residing at Allenville, in the county of Moultrie and State of Illinois, have invented certain new and useful Improvements in Broom-Corn Harvesters, of which the following is a specification.

This invention relates to improvements in broom-corn harvesters.
The general method pursued in harvesting broom-corn is to cut the same by means of small knives carried by the laborers; but this is necessarily slow and laborious and oftentimes attended by great difficulty.
It is therefore the object of the present invention to provide a machine which is so constructed as to be capable of severing in approximately-uniform lengths the tops or heads of the stalks while the latter are standing in the field and to so operate upon the tops or heads thus severed as to effectually thresh the same, thereby greatly facilitating the gathering of the corn and reducing the expense of its harvest to a minimum.
With this and other objects in view, which will appear as the nature of the improvements is better understood, the invention consists, substantially, in the novel construction, combination, and arrangement of parts, as will be hereinafter fully described, illustrated in the accompanying drawings, and pointed out in the appended claims.

In the drawings, Figure 1 is a top plan view of a broom-corn harvester constructed in accordance with the present invention. Fig. 2 is a longitudinal sectional view thereof on the line 2 2, Fig. 1. Fig. 3 is a transverse sectional view. Fig. 4 is a detail elevation of the threshing-rollers, the cutting mechanism, and the immediately-adjacent parts. Fig. 5 is a similar view, on an enlarged scale, of the threshing-rollers and illustrating their relation to the means for feeding the tops or heads of the stalks therethrough. Fig. 6 is a detail sectional view of the cutting mechanism. Fig. 7 is an elevation, on an enlarged scale, of the resilient retainer for holding the stalks upon the feed-chains as said stalks pass to the threshing-rollers. Figs. 8 and 9 are side and edge elevations, respectively, of one of the links of the feed-chains and the gathering-finger carried thereby. Figs. 10 and 11 are detail views illustrating the positions which the gathering-fingers assume during the travel of the feed-chains.
Referring to the drawings, the numeral 1 designates a rectangular platform, which may be of any suitable construction; but said platform has a rear open portion, as clearly shown.

Secured to the under side of the platform 1 and at each side thereof is a bearing 2, and journaled in said bearings 2 is a transverse axle 3, having secured to its ends bearing-wheels 4. A master gear-wheel 5 is also mounted upon the axle 3, and it will be observed that the latter is immediately beneath the rear open portion of the platform 1 in order that said gear-wheel 5 may extend upwardly therethrough for imparting motion to the working parts of the machine.

Disposed above the axle 3 and extending in parallel relation therewith is a counter-shaft 6, which shaft is provided with a pinion 7, meshing with the gear-wheel 5, and said shaft 6 is also provided with sprocket-wheels 8 and 9. Counter-shafts 10 and 11 are also respectively arranged in front and in rear of the shaft 6, and said shafts are respectively provided with sprocket-wheels 12 and 13, through which medium, together with chains 14 and 15, motion is imparted to said shafts from the shaft 6.

The shafts 10 and 11 are designed for operating the cutting and threshing mechanisms; but to the end that a comprehensive idea of each may be obtained said mechanisms will be separately described. Proceeding, therefore, with the cutting mechanism, it will be observed that a pair of vertical standards 16 is arranged at one side of the platform 1, but adjacent to the axle 3, and each of said standards is provided at its upper end with a horizontally-disposed outwardly-projecting supporting-beam 17, upon which beams is secured an auxiliary platform 18, the standards 16 also being each provided with a downwardly-inclined transverse brace 19, which extends to the edge of the platform 1 opposite to that whereon the standards 16 are located. The platform 18 is in a plane considerably above the platform 1, the purpose of which will presently appear. Arranged at the forward edge of the platform 18 and extending transversely thereof is a pair of spaced journal-bars 20, and secured in the foremost of said bars is a primary cutter 21. The cutter 21, however, is horizontally disposed and consists of the ordinary stationary finger-bar 22 and the reciprocating knife 23, having a longitudinal guide-rib 24, by which said knife is retained within the journal-bar 20 and its proper reciprocatory movement insured.

For imparting motion to the knife 23 a shaft 25 is journaled in bearing-brackets 26, which brackets are secured to and extend upwardly from the foremost brace 19, and it will be noted that said shaft is parallel with the longitudinal axis of the machine or at right angles to the counter-shaft 10. The forward end of the shaft 25 projects over said shaft 10 and has secured thereto a sprocket-wheel 27, and mounted upon the shaft 10 is a sprocket-wheel 28. A crossed sprocket-chain 29 connects the wheels 27 and 28, and through the medium of said chain the motion of the shaft 10 is transmitted to the shaft 25. Secured to the forward extremity of the shaft 25 is a crank-wheel 30, to which is connected one end of a pitman 31, and the other end of said pitman is suitably attached to the knife 23. It is therefore obvious that as the crank-wheel 30 rotates motion is communicated to the knife 23, which in turn reciprocates upon the finger-bar 22 and in conjunction with the latter effectually severs the cornstalks as the same are fed thereto.

At this point it will be observed that the means employed for directing the stalks of the corn to the primary cutter 21 consists of a series of inclined pick-up bars 32, arranged in pairs and so spaced that each pair is adapted to straddle a single row, and said bars 32 extend downwardly and forwardly from the platform 18 and lie in a plane forming an acute angle with the plane of the platform 1. The upper portions of the bars 32 are connected to the foremost of the supporting-beams 17 by attaching-brackets 33, while their lower ends, excepting that of the innermost bar, are supported by rearwardly-extending upwardly-inclined braces 34, the latter being also connected at their rear ends to the rear supporting-beam 17 and to the foremost of said beams by straps 35. The lower end of the innermost bar 32 is connected directly to the side of the platform 1.

Journaled in the ends of the bars 32 are sprocket-wheels 36, over which wheels pass feed-chains 37, and the links of said feed-chains at suitable distances apart are provided with gathering-fingers 38. By referring to Figs. 8 and 9 the construction of these fingers is clearly shown, and it will be noted that the body portion of each of the fingers 38 is coiled around one side of the link, so as to provide a hinge connection therewith, while its ends remain straight, one of said ends being longer than the other and forming a gathering-arm 39 and the other forming a contact-arm 40. The gathering-arms 39 of the fingers extend across the space between each pair of the arms 32 and are adapted to engage the stalks for feeding the latter to the primary cutter 21; but the precise mode of operation will be subsequently described. Secured to the lower end of each of the bars 32 is a downwardly-extending rake-shoe 41, which shoes are arranged at the outer sides of the pairs of said arms, so as to permit free movement of the gathering-fingers 38, and said shoes are designed to engage the fallen stalks and so position the same as to enable them readily to pass into and between the pairs of the bars 32. A downwardly-extending releasing-plate 42 is also carried by each of the bars 32, said plates being located at the inner sides of the pairs of said bars, and the rear edge of each of said plates is curved toward the bar carrying the latter to form a flange 43, so that the gathering-arms 39 of the fingers 38 may contact with and ride thereover in the travel of the feed-chains 37 over the upper sprocket-wheels 36, and thereby disengage said fingers from the stalks. The flanges 43 begin at the tops of the plates 42 and extend downwardly throughout their entire length.

Each of the shafts of the sprocket-wheels 36 is elongated and has mounted thereon a sprocket-wheel 44, and extending transversely of the platform 18, beneath the front edge thereof, is a shaft 45, having a series of sprocket-wheels 46 secured thereto. These wheels are in vertical alinement with the wheels 44, and connecting the latter and the wheels 46 is a series of sprocket-chains 47, by means of which motion is communicated to the feed-chains 37 from the shaft 45. The latter has at its inner end a sprocket-wheel 48, over which a sprocket-chain 49 is adapted to travel, and said chain 49 also travels over a sprocket-wheel 50, mounted upon the counter-shaft 10. It will thus be seen that the shaft 10, while being adapted to impart motion to the cutting mechanism, is also adapted to operate the shaft 45, which in turn operates the feed-chains 37 through the connections described.

The cutter 21 is designed for primarily severing the tops or heads from the stalks, and inasmuch as the average height of the stalks is eleven feet and it is desired to cut the same about seven feet above the ground it is essential that the auxiliary platform 18 should be in a plane considerably above the platform 1. It will therefore be obvious that by reason of this the length of the tops or heads which are cut is about four feet; but in order that said tops or heads may have a uniform length before the same are fed to the threshing mechanism a secondary cutter 51 is arranged in rear of the primary cutter 21. This secondary cutter is also of the ordinary construction, consisting of a stationary finger-bar 52 and a reciprocating knife 53, working thereon and provided with a longitudinal guide-rib 54; but said cutter is vertically disposed and is secured on the rear journal-bar 20. A pitman 55 is suitably attached to the reciprocating knife 53, and said pitman is also connected to a crank-wheel 56, mounted upon the rear end of the shaft 25, by means of which motion is imparted to said knife. As the tops or heads are severed from the stalks by the primary cutter 21 said tops or heads fall upon the platform 18, and the extremities of said tops or heads strike against a transversely-extending head-adjuster 57. This latter is hingedly connected to the upper surface of the rear edge of the platform 18 and is capable of vibratory motion at a high speed, and by means of this it will be seen that the extremities of the tops or heads are at once evened, so that the portions thereof immediately adjacent to the point where they were previously cut or severed from the stalks are driven between the primary and secondary cutters. Hence it is evident that inasmuch as the tops or heads lie upon the cutter 51, which is vertically disposed, such portions will be severed by the secondary cutter and those portions of the tops or heads which lie between the secondary cutter and the head-adjuster 57 will be of uniform length. By means of an apron conveyer 58, which travels over a pair of rollers 59, journaled between the ends of the bars 20, the ends of the tops or heads which are severed by the cutter 51 are carried over the side of the platform 18 and deposited upon the ground, said conveyer being operated by a sprocket-chain 60, which travels over the innermost roller 59 and a sprocket-wheel 61, mounted upon the shaft 25 adjacent to the sprocket-wheel 27.

After the tops or heads have been operated upon by the secondary cutter 51 the same fall upon a series of conveyer-belts 62, extending transversely of the platform 18 between said cutter and the head-adjuster 57, and said belts work upon rollers 63, journaled at the sides of said platform. The belts 62 are adapted to convey the tops or heads to the threshing mechanism, their direction of motion being opposite to that of the apron conveyer 58, and for communicating motion to said belts a sprocket-wheel 64 is mounted upon the innermost roller 63, on which wheel a crossed sprocket-chain 65 travels, and said chain also travels over a sprocket-wheel 66, mounted upon the shaft 25 immediately in front of the crank-wheel 56.

The numeral 67 designates a pair of vertically-disposed toothed feed-chains which work upon the innermost roller 63 and a roller 68, vertically alined therewith and journaled between the standards 16 at a point intermediate their ends, and extending across the platform 1 in a plane corresponding with the roller 68 and fitting between the braces 19 is a receiving-table 69. The latter has journaled at a point intermediate its ends a roller 70, over which roller and the roller 68 works a horizontally-disposed toothed feed-chain 71. The feed-chains 67 and 71 are adapted to transfer the tops or heads from the platform 18 to the threshing mechanism, and the teeth of said chains readily engage said tops or heads, thus insuring a positive feed.

The threshing mechanism consists of a pair of rollers 72, each of which is provided with longitudinal rows of pins or studs 73, regularly spaced from each other; but the pins or studs of each row are arranged opposite the spaces between the pins or studs of the rows immediately adjacent. The rollers 72 rotate in opposite directions, and it will be further observed that said rollers are arranged directly in rear of the feed-chain 71 and at an acute angle to said chain, or approximately forty-five degrees thereto. Hence it is evident that as the tops or heads are carried along by the chain 71 the fibrous ends thereof pass between the rollers 72, where said ends are acted upon by the teeth 73 and a clean separation of the seeds from said ends effected. The shafts of the rollers 72 at one of their ends are elongated and pass through a journal-block 74, secured to the rear standard 16, while the other end of the shaft of the upper roller is journaled in a depending bracket 75, attached to a cross-bar 76, carried by the braces 19 above the receiving-table 69, the corresponding end of the shaft of the lower threshing-roller being journaled in said table.

Arranged above the threshing-rollers 72 is a fan-casing 77, in which is disposed any suitable construction of fan for creating a blast, and the spout of said casing directs said blast against the tops or heads in order to separate the blades from the latter as they are carried to the threshing-rollers. The shaft of the fan is elongated and has mounted thereon a sprocket-wheel 78, over which travels a sprocket-chain 79, and said chain also travels over a sprocket-wheel 80, mounted upon the counter-shaft 11. The elongated ends of the shafts of the threshing-rollers 72 are also provided with grooved wheels 81, and the chain 79 passes between these wheels, thereby imparting motion to the rollers 72 and also giving them the opposite rotation before mentioned.

A crank-wheel 82 is secured to the extremity of the fan-shaft, to which wheel is attached a pitman 83, and said pitman is suitably connected to the head-adjuster 57, and as the crank-wheel 82 rotates the pitman 83 transmits motion to the head-adjuster 57, which in turn vibrates at a high speed, as previously described.

The feed-chain 71 works between the chains 67, and to prevent the former being drawn toward the threshing-rollers a guard 84 is provided, said guard extending along the upper surface of the table 69 beneath the chain 71 and having an upwardly-extending flange 85 at its edge adjacent to the rollers 72. By this flange the chain 71 is prevented being drawn toward said rollers; but the same in no manner hinders the free movement of said chain or the feeding of the tops or heads to the rollers 72. It is, however, essential that means be provided for retaining the tops or heads upon the chains 67 and 71 as the same are carried to and between the threshing-rollers, and to accomplish this end a resilient retainer 86 is employed. This consists of a strip of suitable material folded upon itself, and said strip after being so folded is bent to form a vertical arm 87 and a horizontal arm 88, said arms extending at right angles to each other, and when the retainer is in position the arm 87 lies adjacent to but spaced from the chains 67, while the arm 88 lies in similar relation to the chain 71. The upper end of the arm 87 is curved, as at 89, so as to extend over and to conform with the innermost roller 63 and also to insure the tops or heads being engaged by the teeth of said chain, and the free end of the arm 88 is bent back parallel therewith, as at 90, and has its extremity bent up at right angles thereto to form an attaching-arm 91, the latter being suitably connected to the cross-bar 76. It will thus be seen that the retainer 86, while holding the tops or heads upon the chains 67 and 71, will also readily yield, and consequently does not affect the passage of the tops or heads to and through the threshing-rollers.

After the tops or heads pass from the threshing-rollers the same are carried by the chain 71 to a pair of conveyer-belts 92, which travel around the roller 70 and also a roller 93, journaled in the free end of the table 69, and secured to said free end of the table 69 is a stop 94, against which the threshed tops or heads are piled by the belts 92. When this pile becomes of sufficient proportions, the same is removed from the receiving-table 69 and placed upon a dump-rack 95, the latter comprising a section of the platform 1, pivotally secured, as at 96, and adapted to be tilted, as shown in dotted lines in Fig. 2, for dumping, which may be done when the machine arrives at the end of the field. A hook 97, carried at the forward end of the platform 1 and engaging the rack 95, prevents the latter tilting, except when desired.

Arranged at the forward end of the platform 1 is a caster-wheel 98, which is swiveled to an upwardly-extending shank 99, the latter passing through said platform and being provided with a series of teeth 100, and fulcrumed upon the platform 1 is an operating-lever 101, having a toothed segment 102, adapted to engage the teeth 100 of the shank 99. It will therefore be seen that the wheel 98 is adjustable, whereby the platform 1 may be elevated or lowered, and hence the pick-up bars 32 are also elevated or lowered and the rake-shoes 41 so positioned as to travel along the ground or be elevated sufficiently thereabove to clear the same, the pick-up bars following the movements of the frame of the machine.

A seat 103 is secured to the cross-bar 76 for the driver of the machine, and the rear bracket 26 is provided with a foot-rest 104, which is also connected to said cross-bar. A pole 105 is also carried by the platform 1 for attaching a draft-team to the machine.

The operation of the herein-described harvester is as follows: A team having been attached to the pole 105 and the caster-wheel 98 having been adjusted so as to position the rake-shoes 41 in the desired relation to the ground the stalks of the corn pass between the pick-up bars 32, and by means of the gathering-fingers 38 and the feed-chains 37 said stalks are fed to the primary cutter 21. The latter, being operated through the shafts 10 and 25 and the connections therebetween, severs the stalks, and the tops or heads fall upon the platform 18, where their upper extremities are acted upon by the head-adjuster 57 for evening the same. The portions of the stalks immediately adjacent to the primary severing-point thereof are cut by the secondary cutter 51, thereby leaving the tops or heads of a uniform length, and such cut portions fall upon the apron conveyer 58, by means of which they are deposited upon the ground. The portions, however, of the tops or heads which are between the head-adjuster 57 and the cutter 51 drop upon the belts 62, which belts transfer the same to the vertical feed-chains 67, and the latter in turn transfer said tops or heads to the horizontal feed-chain 71. This chain 71 carries the tops or heads to the threshing-rollers 72, the teeth 73 of which act thereon for separating the seed therefrom, and after passing through said rollers the threshed tops or heads are transferred to the belts 92, which pile said tops or heads against the stop 94. When this pile has reached sufficient proportions, the same is removed to the dump-rack 95 by one of the attendants of the machine, from which the tops or heads are removed by tilting said rack when the end of the field is reached.

The operation of the gathering-fingers 38 is of special significance, and by referring to Figs. 8 to 11, inclusive, such operation will be readily understood. As the feed-chains 37 move upwardly the gathering-arm 39 is in the position shown in Figs. 8 and 9, in which position the same extends across the space between the pick-up bars 32. It will be readily appreciated that in this position the stalks are engaged, and consequently directed to the cutter 21; but immediately upon the finger 38 reaching the releasing-plate 42 the arm 39 rides upon and along the curved flange 43, and said arm is moved to a position at right angles to that previously occupied by it. This position is shown in full lines in Fig. 10, which discloses the link on the downward movement of the feed-chain 37, the contact-arm 40 lying across the link and in a position to be engaged by one of the teeth of the sprocket-wheel 36 at the lower end of the pick-up bars 32. When, therefore, the link arrives at said wheel and one of the teeth of the latter passes into the link, the contact-arm 40 is engaged thereby, with a resultant swing of the finger 38 upon the link to the position shown in dotted lines in Fig. 10, in which position the gathering-arm 39 lies across the space between the pick-up bars 32 and is again adapted, after the link has rounded the wheel, to engage a stalk on the upward movement of the feed-chain 37.

The framework of the herein-described machine is preferably made of steel; but of course any other desired material may be substituted therefor, and it will also be understood that the invention is susceptible of various changes in the form, proportion, and minor details of construction. The right is therefore reserved to change, modify, or vary the invention as falls within the spirit and scope thereof.

Having thus described the invention, what is claimed as new, and desired to be secured by Letters Patent, is—

1. In a broom-corn harvester, means for severing the tops or heads of the stalks, means for threshing the tops or heads so severed, and means for evening the severed tops or heads before the same are acted upon by the threshing means.

2. In a broom-corn harvester, means for severing the tops or heads of the stalks, chains for feeding the stalks to said severing means, means for threshing the tops or heads so severed, and means for evening the severed tops or heads before the same are acted upon by the threshing means.

3. In a broom-corn harvester, means for severing the tops or heads of the stalks, means for feeding the stalks thereto, means for threshing the tops or heads so severed, and means for evening said tops or heads before the same are acted upon by the threshing means.

4. In a broom-corn harvester, a cutter for severing the tops or heads of the stalks, a plurality of rollers for threshing the severed tops or heads, means between said cutter and said rollers for conveying the said tops or heads from the cutter to the rollers, and means for evening the severed tops or heads before the same are acted upon by the rollers.

5. In a broom-corn harvester, a cutter for severing the tops or heads of the stalks, rollers for threshing the severed tops or heads, and means between said cutter and said rollers for evening the severed tops or heads before the latter are fed to the rollers.

6. In a broom-corn harvester, a cutter for severing the tops or heads of the stalks, rollers for threshing the severed tops or heads, and a head-adjuster between said cutter and said rollers for evening the severed tops or heads before the latter are fed to the rollers.

7. In a broom-corn harvester, a cutter for severing the tops or heads of the stalks, rollers for threshing the severed tops or heads, and a vibratory head-adjuster between said cutter and said rollers for evening the severed tops or heads before the latter are fed to the rollers.

8. In a broom-corn harvester, a cutter for severing the tops or heads of the stalks, means for feeding the stalks thereto, rollers for threshing the tops or heads so severed, and a head-adjuster for evening said tops or heads before the same are acted upon by the threshing-rollers.

9. In a broom-corn harvester, a cutter for severing the tops or heads of the stalks, means for feeding the stalks thereto, rollers for threshing the tops or heads so severed, and a vibratory head-adjuster arranged between said cutter and said rollers for evening said tops or heads before the same are acted upon by the rollers.

10. In a broom-corn harvester, a cutter for severing the tops or heads of the stalks, rollers for threshing the tops or heads so severed, a vibratory head-adjuster arranged between said cutter and said rollers for evening said tops or heads before the same are acted upon by the rollers, and conveyers for carrying the tops or heads from the cutter to said rollers.

11. In a broom-corn harvester, a cutter for severing the tops or heads of the stalks, pick-up bars for directing the stalks to said cutter, a plurality of rollers for threshing the severed tops or heads, means for conveying the tops or heads from the cutter to said rollers, and means for evening the severed tops or heads before the same are acted upon by the rollers.

12. In a broom-corn harvester, a cutter for severing the tops or heads of the stalks, pick-up bars for directing the stalks to said cutter, rollers for threshing the severed tops or heads, a head-adjuster for evening said tops or heads before the same are acted upon by said rollers, and means for conveying the tops or heads from the cutter to said rollers.

13. In a broom-corn harvester, a cutter for severing the tops or heads of the stalks, pick-up bars arranged adjacent thereto, feed-chains carried by said bars for directing the stalks to said cutter, a plurality of rollers for threshing the severed tops or heads, and means for evening the severed tops or heads before the same are acted upon by said rollers.

14. In a broom-corn harvester, a cutter for severing the tops or heads of the stalks, pick-up bars arranged adjacent thereto, feed-chains carried by said bars for directing the stalks to said cutter, rollers for threshing the severed tops or heads, and a head-adjuster for evening the tops or heads of the stalks before the same are acted upon by said rollers.

15. In a broom-corn harvester, a cutter for severing the tops or heads of the stalks, pick-up bars arranged adjacent thereto, feed-chains carried by said bars, gathering-fingers carried by said chains and adapted to engage the stalks to direct the latter to said cutter, a plurality of rollers for threshing the severed tops or heads, and means for evening the severed tops or heads before the same are acted upon by said rollers.

16. In a broom-corn harvester, a cutter for severing the tops or heads of the stalks, pick-up bars arranged adjacent thereto, feed-chains carried by said bars, gathering-fingers carried by said chains and adapted to engage the stalks to direct the latter to said cutter, rollers for threshing the severed tops or heads, and a head-adjuster for evening the tops or heads of the stalks before the same are acted upon by said rollers.

17. In a broom-corn harvester, a cutter for severing the tops or heads of the stalks, pick-up bars arranged adjacent thereto, feed-chains carried by said bars, gathering-fingers carried by said chains and adapted to engage the stalks to direct the latter to said cutter, rollers for threshing the severed tops or heads, and a vibratory head-adjuster for evening the tops or heads of the stalks before the same are acted upon by said rollers.

18. In a broom-corn harvester, a primary cutter for severing the tops or heads of the stalks, means for evening the tops or heads so severed, and a secondary cutter for further severing said tops or heads to impart uniform length thereto.

19. In a broom-corn harvester, a primary cutter for severing the tops or heads of the stalks, means for evening the tops or heads so severed, a secondary cutter for further severing said tops or heads to impart uniform length thereto, and rollers for threshing the tops or heads after the same have been acted upon by the secondary cutter.

20. In a broom-corn harvester, a primary cutter for severing the tops or heads of the stalks, means for feeding the stalks thereto, means for evening the severed tops or heads, and a secondary cutter for further severing said tops or heads to impart uniform length thereto.

21. In a broom-corn harvester, a primary cutter for severing the tops or heads of the stalks, means for feeding the stalks thereto, means for evening the severed tops or heads, a secondary cutter for further severing said tops or heads to impart uniform length thereto, and rollers for threshing the tops or heads after the same have been acted upon by the secondary cutter.

22. In a broom-corn harvester, a horizontally-disposed primary cutter for severing the tops or heads of the stalks, means for feeding the stalks thereto, means for evening the severed tops or heads, and a vertically-disposed secondary cutter for further severing said tops or heads to impart uniform length thereto.

23. In a broom-corn harvester, a horizontally-disposed primary cutter for severing the tops or heads of the stalks, means for feeding the stalks thereto, means for evening the severed tops or heads, a vertically-disposed secondary cutter for further severing said tops or heads to impart uniform length thereto, and rollers for threshing the tops or heads after the same have been acted upon by the secondary cutter.

24. In a broom-corn harvester, a cutter for severing the tops or heads of the stalks, rollers for threshing the tops or heads so severed, and means for separating the blades from said tops or heads as the latter are carried to the threshing-rollers.

25. In a broom-corn harvester, a cutter for severing the tops or heads of the stalks, rollers for threshing the tops or heads so severed, and a fan for separating the blades from said tops or heads as the latter are carried to the threshing-rollers.

26. In a broom-corn harvester, a cutter for severing the tops or heads of the stalks, rollers for threshing the tops or heads so severed, a head-adjuster for evening the tops or heads before the same are acted upon by said rollers, and a fan for separating the blades from the tops or heads as the latter are carried to the threshing-rollers.

27. In a broom-corn harvester, a cutter for severing the tops or heads of the stalks, rollers for threshing the tops or heads so severed, a vibratory head-adjuster for evening the tops or heads before the same are acted upon by said rollers, and a fan for separating the blades from the tops or heads as the latter are carried to the threshing-rollers.

28. In a broom-corn harvester, a platform, an auxiliary platform carried thereby, a cutter mounted upon said auxiliary platform for severing the tops or heads of the stalks, rollers for threshing the tops or heads so severed, means for evening the tops or heads before the latter are acted upon by the threshing-rollers, and means for conveying the severed tops or heads from the cutter to the threshing-rollers.

29. In a broom-corn harvester, a platform, an auxiliary platform carried thereby, a cutter mounted upon said auxiliary platform for severing the tops or heads of the stalks, rollers for threshing the tops or heads so severed, a head-adjuster for evening the tops or heads before the latter are acted upon by the threshing-rollers, and means for conveying the severed tops or heads from the cutter to the threshing-rollers.

30. In a broom-corn harvester, a platform, an auxiliary platform carried thereby, a cutter mounted upon said auxiliary platform for severing the tops or heads of the stalks, rollers for threshing the tops or heads so severed, a head-adjuster for evening the tops or heads before the latter are acted upon by the threshing-rollers, means for conveying the severed tops or heads from the cutter to the threshing-rollers, and a fan for separating the blades from the tops or heads as the latter are conveyed to the threshing-rollers.

31. In a broom-corn harvester, a platform, an auxiliary platform carried thereby, a cutter mounted upon said auxiliary platform for severing the tops or heads of the stalks, feed-chains for conveying the stalks to said cutter, rollers for threshing the severed tops or heads, a head-adjuster for evening the tops or heads before the latter are acted upon by the threshing-rollers, means for conveying the severed tops or heads from the cutter to the threshing-rollers, and a fan for separating the blades from the tops or heads as the latter are conveyed to the threshing-rollers.

32. In a broom-corn harvester, a platform, an auxiliary platform carried thereby, a primary cutter mounted upon said auxiliary platform for severing the tops or heads of the stalks, a head-adjuster for evening the tops or heads so severed, a secondary cutter also mounted upon said auxiliary platform and adapted to further sever the tops or heads for imparting uniform length thereto, and rollers for threshing the tops or heads after the same have been acted upon by the secondary cutter.

33. In a broom-corn harvester, a platform, an auxiliary platform carried thereby, a primary cutter mounted upon said auxiliary platform for severing the tops or heads of the stalks, a head-adjuster for evening the tops or heads so severed, a secondary cutter also mounted upon said auxiliary platform and adapted to further sever the tops or heads for imparting uniform length thereto, rollers for threshing the tops or heads after the same have been acted upon by the secondary cutter, and a fan for separating the blades from the tops or heads before the latter are acted upon by the threshing-rollers.

34. In a broom-corn harvester, a platform, an auxiliary platform carried thereby, a cutter mounted upon said auxiliary platform for severing the tops or heads of the stalks, feed-chains for conveying the stalks to said cutter, a head-adjuster for evening the severed tops or heads, rollers for threshing said severed tops or heads, and feed-chains for conveying the tops or heads to and through said rollers.

35. In a broom-corn harvester, a platform, an auxiliary platform carried thereby, a cutter mounted upon said auxiliary platform for severing the tops or heads of the stalks, feed-chains for conveying the stalks to said cutter, a head-adjuster for evening the severed tops or heads, rollers for threshing said severed tops or heads, feed-chains for conveying the tops or heads to and through said rollers, and a fan for separating the blades from the tops or heads before the latter are acted upon by the threshing-rollers.

36. In a broom-corn harvester, a platform, an auxiliary platform carried thereby, a primary cutter mounted upon said auxiliary platform for severing the tops or heads of the stalks, a head-adjuster for evening the tops or heads so severed, a secondary cutter also mounted upon said auxiliary platform and adapted to further sever the tops or heads for imparting uniform length thereto, rollers for threshing the tops or heads, feed-chains for conveying the tops or heads to and through said rollers, and a fan for separating the blades from the tops or heads before the latter are acted upon by the threshing-rollers.

37. In a broom-corn harvester, a platform, an auxiliary platform carried thereby, a primary cutter mounted upon said auxiliary platform for severing the tops or heads of the stalks, a head-adjuster for evening the tops or heads so severed, a secondary cutter also mounted upon said auxiliary platform and adapted to further sever the tops or heads for imparting uniform length thereto, rollers for threshing the tops or heads, feed-chains for conveying the tops or heads to and through said rollers, a retainer for holding the tops or heads upon said feed-chains, and a fan for separating the blades from the tops or heads before the latter are acted upon by the threshing-rollers.

38. In a broom-corn harvester, a platform, an auxiliary platform carried thereby, a primary cutter mounted upon said auxiliary platform for severing the tops or heads of the stalks, a head-adjuster for evening the tops or heads so severed, a secondary cutter also mounted upon said auxiliary platform and adapted to further sever the tops or heads for imparting uniform length thereto, rollers for threshing the tops or heads, toothed feed-chains for conveying the tops or heads to and through said rollers, a retainer for holding the tops or heads upon said feed-chains, and a fan for separating the blades from the tops or heads before the latter are acted upon by the threshing-rollers.

39. In a broom-corn harvester, a platform, an auxiliary platform carried thereby, a primary cutter mounted upon said auxiliary platform for severing the tops or heads of the stalks, pick-up bars arranged in advance of said primary cutter, feed-chains carried by said pick-up bars for conveying the stalks to the cutter, a head-adjuster for evening the severed tops or heads, a secondary cutter also mounted upon the auxiliary platform and adapted to further sever the tops or heads for imparting uniform length thereto, rollers for threshing the severed tops or heads, feed-chains for conveying the tops or heads to and through said rollers, and a fan for separating the blades from the tops or heads before the latter are acted upon by the threshing-rollers.

40. In a broom-corn harvester, a platform, an auxiliary platform carried thereby, a horizontally-disposed primary cutter mounted upon said auxiliary platform and adapted to sever the tops or heads of the stalks, pick-up bars arranged in advance of said primary cutter, feed-chains carried by said pick-up bars for conveying the stalks to the cutter, a head-adjuster for evening the severed tops or heads, a vertically-disposed secondary cutter also mounted upon the auxiliary platform and adapted to further sever the tops or heads for imparting uniform length thereto, rollers for threshing the severed tops or heads, feed-chains for conveying the tops or heads to and through said rollers, a retainer for holding the tops or heads upon said feed-chains, and a fan for separating the blades from the tops or heads before the latter are acted upon by the threshing-rollers.

41. In a broom-corn harvester, means for severing the tops or heads of the stalks, means for threshing the tops or heads so severed, means for conveying the severed tops or heads from the severing means to and through said threshing means, and a retainer for holding the tops or heads upon said conveying means during their passage to and through the threshing means.

42. In a broom-corn harvester, means for severing the tops or heads of the stalks, means for threshing the tops or heads so severed, means for conveying the severed tops or heads from the severing means to and through said threshing means, and a resilient retainer for holding the tops or heads upon said conveying means during their passage to and through the threshing means.

43. In a broom-corn harvester, a cutter for severing the tops or heads of the stalks, pick-up bars arranged in advance of said cutter, feed-chains carried by said pick-up bars and adapted to convey the stalks to the cutter, gathering-fingers arranged at spaced intervals on said chains and each having its body portion coiled around one side of one of the links of the chains to form a hinge connection therewith, one end of said finger forming a gathering-arm adapted to engage the stalks, and the other end forming a contact-arm, and releasing devices carried by the pick-up bars and adapted to be engaged by the gathering-arms of the gathering-fingers, whereby said arms are released from engagement with the stalks.

In testimony whereof I affix my signature in presence of two witnesses.

JAMES STEVEN VAUGHN.

Witnesses:
J. H. RIDGWAY,
ALBERT F. COX.